United States Patent
Cheng et al.

(10) Patent No.: US 10,844,247 B2
(45) Date of Patent: Nov. 24, 2020

(54) ADHESIVE ARTICLE BACKING WITH SORBENT MATERIAL

(71) Applicant: 3M INNOVATIVE PROPERTIES COMPANY, St. Paul, MN (US)

(72) Inventors: Shijing Cheng, Woodbury, MN (US); Kiu-Yuen Tse, Woodbury, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 228 days.

(21) Appl. No.: 16/062,887

(22) PCT Filed: Dec. 13, 2016

(86) PCT No.: PCT/US2016/066257
§ 371 (c)(1),
(2) Date: Jun. 15, 2018

(87) PCT Pub. No.: WO2017/106123
PCT Pub. Date: Jun. 22, 2017

(65) Prior Publication Data
US 2018/0355218 A1 Dec. 13, 2018

Related U.S. Application Data

(60) Provisional application No. 62/269,263, filed on Dec. 18, 2015.

(51) Int. Cl.
*C09J 7/21* (2018.01)
*C09J 7/38* (2018.01)
(Continued)

(52) U.S. Cl.
CPC . *C09J 7/21* (2018.01); *C09J 7/38* (2018.01); *C09J 11/04* (2013.01); *C09J 175/04* (2013.01);
(Continued)

(58) Field of Classification Search
None
See application file for complete search history.

(56) References Cited

U.S. PATENT DOCUMENTS

| 2,532,011 A | 11/1950 | Dahlquist |
| 4,313,988 A | 2/1982 | Koshar |

(Continued)

FOREIGN PATENT DOCUMENTS

| EP | 0250248 | 12/1987 |
| EP | 1642950 | 4/2006 |

(Continued)

OTHER PUBLICATIONS

"Thermodesorption analysis of organic emissions for the characterization of non-metallic automobile interior materials", VDA278, pp. 01-19.

(Continued)

*Primary Examiner* — Frank D Ducheneaux
(74) *Attorney, Agent, or Firm* — Jean A. Lown

(57) ABSTRACT

Described herein is a backing comprising a sorbent material entrapped in a non-woven fiber matrix, wherein the backing comprises a first and a second major surface; and a first adhesive layer contacting the first major surface of the backing, wherein the first adhesive layer comprises a pressure sensitive adhesive.

13 Claims, 1 Drawing Sheet

(51) Int. Cl.
*C09J 7/40* (2018.01)
*C09J 175/04* (2006.01)
*C08K 3/04* (2006.01)
*C08K 3/36* (2006.01)
*C09J 11/04* (2006.01)

(52) U.S. Cl.
CPC ............ *C08K 3/04* (2013.01); *C08K 3/36* (2013.01); *C09J 7/40* (2018.01); *C09J 2301/302* (2020.08); *C09J 2301/41* (2020.08); *C09J 2400/263* (2013.01); *C09J 2401/006* (2013.01); *C09J 2421/00* (2013.01); *C09J 2423/046* (2013.01); *C09J 2423/106* (2013.01); *C09J 2433/00* (2013.01); *C09J 2467/006* (2013.01); *C09J 2475/00* (2013.01); *C09J 2477/006* (2013.01); *C09J 2483/00* (2013.01)

(56) References Cited

U.S. PATENT DOCUMENTS

| | | | |
|---|---|---|---|
| 4,482,687 A | 11/1984 | Noshay | |
| 4,737,577 A | 4/1988 | Brown | |
| 4,904,343 A | 2/1990 | Giglia | |
| 5,082,706 A | 1/1992 | Tangney | |
| 5,167,995 A * | 12/1992 | Johnson | B32B 27/06 428/41.3 |
| 5,516,390 A | 5/1996 | Tomita | |
| 5,578,381 A | 11/1996 | Hamada | |
| 5,804,610 A | 9/1998 | Hamer | |
| 6,403,190 B1 | 6/2002 | Casey | |
| 6,928,794 B2 | 8/2005 | Hamer | |
| 7,879,441 B2 | 2/2011 | Gehlsen | |
| 2002/0004130 A1 | 1/2002 | Lhila | |
| 2003/0182833 A1 | 10/2003 | Lewis | |
| 2003/0190468 A1 | 10/2003 | Khandpur | |
| 2003/0211308 A1 | 11/2003 | Khandpur | |
| 2004/0082243 A1 | 4/2004 | Kulper | |
| 2006/0035020 A1 | 2/2006 | Hennen | |
| 2007/0213449 A1 | 9/2007 | Lewandowski | |
| 2008/0147028 A1 | 6/2008 | Luna | |
| 2012/0045604 A1 | 2/2012 | Gavel | |
| 2013/0183471 A1 | 7/2013 | Luhmann | |
| 2014/0261988 A1 | 9/2014 | Stewart-Irvin | |
| 2014/0363603 A1 | 12/2014 | Telgenbuscher et al. | |
| 2015/0337174 A1 | 11/2015 | Keite-Telgenbuscher | |

FOREIGN PATENT DOCUMENTS

| | | |
|---|---|---|
| EP | 2832780 | 2/2015 |
| GB | 1550960 | 8/1979 |
| JP | H09078044 | 3/1997 |
| JP | H10202790 | 8/1998 |
| JP | 2002-180026 | 6/2002 |
| JP | 2005-255794 | 9/2005 |
| JP | 2006-282752 | 10/2006 |
| JP | 2009-001606 | 1/2009 |
| WO | WO 1998-021287 | 5/1998 |
| WO | WO 1999-039675 | 8/1999 |
| WO | WO 2010-147888 | 3/2010 |
| WO | WO 2017-106116 | 6/2017 |
| WO | WO 2017-106122 | 6/2017 |

OTHER PUBLICATIONS

Satas, "Handbook of Pressure Sensitive Adhesive Technology,", Van Nostrand Reinhold, New York, 1989, pp. 585-600.
International Search report for PCT International Application No. PCT/US2016/066257 dated Mar. 30, 2017, 5 pages.

* cited by examiner

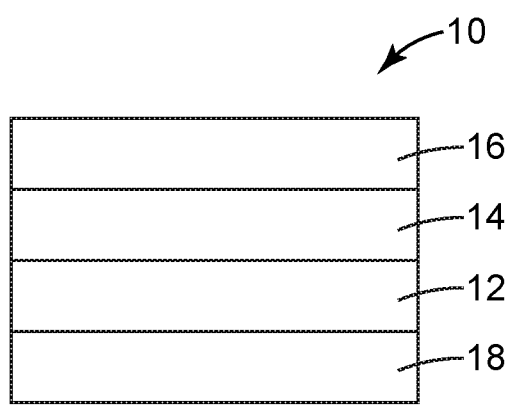

ADHESIVE ARTICLE BACKING WITH SORBENT MATERIAL

CROSS REFERENCE TO RELATED APPLICATIONS

This application is a national stage filing under 35 U.S.C. 371 of PCT/US2016/066257, filed Dec. 13, 2016, which claims the benefit of U.S. Application No. 62/269,263, filed Dec. 18, 2015, the disclosure of which is incorporated by reference in its/their entirety herein.

TECHNICAL FIELD

Backings for adhesive articles are disclosed wherein the backing comprises a sorbent material to sorb volatile organic compounds from pressure sensitive adhesives.

DESCRIPTION OF THE FIGURE

FIG. 1 is a cross-sectional view of an adhesive article according to one embodiment of the present disclosure.

SUMMARY

There is a desire to provide an adhesive article comprising a material to sorb volatile organic compounds.

In one aspect, an adhesive article is described comprising:
a backing comprising a sorbent material entrapped in a non-woven fiber matrix, wherein the backing comprises a first and a second major surface; and
a first adhesive layer contacting the first major surface of the backing, wherein the first adhesive layer comprises a pressure sensitive adhesive.

In another aspect, a method of making an adhesive article comprising:
(a) providing a backing comprising a sorbent material entrapped in a non-woven fiber matrix; and
(b) disposing a first adhesive layer onto a first major surface of the backing, wherein the first adhesive layer comprises a pressure sensitive adhesive.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Volatile organic compounds (VOCs) are any compounds comprising carbon (excluding carbon monoxide, carbon dioxide, carbonic acid, metallic carbides or metallic carbonates, and ammonium carbonate) that have sufficient vapor pressures such that under normal conditions, vaporize, and enter the atmosphere. It can be advantageous to contain VOCs in finished goods, such as adhesive articles, to (a) limit VOC release into the environment, which can be environmentally or odorously undesirable, and/or (b) prevent the VOC from impacting the performance or aesthetics of the finished good.

U.S. Pat. Publ. No. 2013/0183471 (Luhmann et al.) discloses a liner for the protection of adhesives, comprising at least one adhesive release layer and at least one layer of a getter material capable of sorbing permeable substances.

It has been discovered that by placing a sorbent material into the backing of an adhesive article, improved capture of VOCs can be achieved.

VOCs as disclosed herein include permeable substances which migrate through the adhesive article and either (a) impact the performance or aesthetics of the adhesive article and/or (b) outgas from the adhesive article causing odor, fogging, and/or environmental concerns. The permeable substances can include volatile and semi-volatile organic compounds. Typically volatile compounds would comprise those compounds having up to 20 carbon atoms, whereas the semi-volatile compounds would comprise those compounds having 16 to 32 carbon atoms. The VOCs of interest to capture in the present disclosure are solvents and raw materials used in manufacture, contaminates in the raw materials, and/or by-products from the manufacture. Exemplary VOCs include, acetonitrile, 1-butanol, chlorobenzene, chloroform(trichloromethane), cyclohexane, diethyl ether, 1,4-dioxane, glacial acetic acid(acetic acid), acetic anhydride, acetic acid ethyl ester(ethyl acetate, ethyl ethanoate), acetic acid n-butyl ester(n-butyl acetate), acetic acid tert-butyl ester(tert-butyl acetate), ethanol, methanol, n-hexane, n-heptane, 3-hexanone, 2-propanol(isopropanol), 3-methyl-1-butanol(isoamyl alcohol), methylene chloride(dichloromethane), 2-ethyl hexyl acetate, 2-ethyl hexyl alcohol, 2-ethyl hexyl acetate, methyl ethyl ketone(butanone), methyl isobutyl ketone, nitromethane(nitrocarbol), n-pentane, 2-pentanone, 3-pentanone, petroleum ether(light benzine), benzine, propanol, pyridine(azine), tert-butyl methyl ether, tetrachloroethene(perchloroethene), tetrahydrofuran, toluene, trichloroethane, xylene, methane, ethane, propane, propene, butane, and butene.

Backing

The present application is directed toward a backing for an adhesive article. The backing of the present disclosure comprises a sorbent material entrapped in a non-woven fiber matrix.

The backing of the present disclosure is made of non-woven material such as spunbond non-woven, melt blown non-woven, carded web, airlaid non-woven, needlepunched non-woven, spunlace non-woven, suitable combinations of the above and the like. The non-woven fiber matrix can be made from natural fiber and/or synthetic polymer fiber.

Exemplary synthetic polymer fiber include polyethylene, polypropylene, polyester, nylon, polylactic acid, and combinations thereof.

Exemplary natural fiber include cellulose, hemp, bamboo, cotton, and combinations thereof.

To ensure adequate support and structural integrity of the backing, at least some of the fibers may comprise an adequate length and diameter. For example, a length of at least 2 mm, 3 mm, 4 mm, 6 mm, 8 mm, 10 mm, 15 mm, 20 mm, 25 mm, or even 30 mm, and a diameter of at least 10 µm (micrometer), 20 µm, 40 µm, or even 60 µm.

In one embodiment, to entrap the sorbent particles and/or ensure a high surface area material, the fibers may comprise a main fibers surrounded by many smaller attached fibrils.

The main fiber generally can have a length in the range of 0.8 mm to 4 mm, and an average diameter between 1 to 20 micrometers. The fibrils typically have a submicrometer diameter.

In one embodiment, two or more different kinds of fibers may be used to enhance the performance of the backing.

The backing of the present disclosure comprises a sorbent material capable of sorbing the VOCs. The sorbing of the VOCs by the sorbing material occurs via absorption and/or adsorption. Adsorption may occur in the form of chemisorption and/or physisorption.

In one embodiment, the sorbent material is porous. The porous nature will enable, for example, more surface area for VOC removal. Preferably, the sorbent material has a high surface area (e.g., at least 100, 200, 500, 600 or even 700 $m^2/g$; and at most 1000, 1200, 1400, 1500, or even 1800 $m^2/g$ based on BET (Brunauer Emmet Teller method) nitrogen adsorption).

The sorbent material may be microporous (having pore widths smaller than 2 nanometers), macroporous (having pore widths between 2 and 50 nanometers), mesoporous (having pore widths larger than 50 nm), or a mixture thereof.

In one embodiment, the sorbent material is predominately microporous, meaning that 65, 75, 80, 85, 90, 95, or even 99% of the pores are microporous, however some of the pores may be larger than microporous.

Exemplary sorbent material include carbon, silica gel, and a zeolite.

Carbon has several allotropes, including diamond, graphite, and amorphous carbon. The carbon used as a sorbent material in the present disclosure are those forms that have a high surface area to volume ratio. In one embodiment the sorbent material is carbon black. In another embodiment, the sorbent material is activated carbon.

Activated carbon, is carbon that has been processed to make it highly porous (i.e., having a large number of pores per unit volume), which thus, imparts a high surface area. Activated carbons may be generated from a variety of materials, however most commercially available activated carbons are made from peat, coal, lignite, wood, and coconut shells. Based on the source, the carbon can have different pore sizes, ash content, surface order, and/or impurity profiles. Coconut shell-based carbon has predominantly a microporus pore size, whereas a wood-based activated carbon has a predominantly mesoporous or macroporous pore size. Coconut shell- and wood-based carbon typically have ash contents less than about 3% by weight, whereas coal-based carbons typically have ash contents of 4-10% by weight or even higher.

Commercially available activated carbons include: activated wood-based carbon available under the trade designation "NUCHAR RGC", by Mead Westvaco Corp, Richmond, Va.; wood-based carbon available under the trade designation "AQUAGUARD" by Mead Westvaco Corp; activated coconut shell-based carbon available under the trade designation "KURARAY PGW" by Kuraray Chemical Co., LTD, Okayama, Japan; and coal-based carbon available under the trade designations "CARBSORB" and "FILTRASORB" by Calgon Carbon Corp., Pittsburgh, Pa.

Silica gel is a vitreous, porous form of silicon dioxide that is hydroscopic and commonly used as a desiccant. Typically silica gel is made from the acidification of sodium silicate solutions, which is then washed and dehydrated to form a microporous silica.

Zeolites are porous aluminosilicate minerals, which are highly crystalline. Zeolites can occur naturally or be produced synthetically. A commercially available zeolite includes ZEOFLAIR a microporous, organophilic inorganic powder available from Zeochem AG, Karst, Germany.

In one embodiment, the sorbent material is distributed throughout the backing layer. In one embodiment, the sorbent material is distributed substantially uniformly through a cross-section of the backing material, meaning that the sorbent material is present at roughly the same concentration (e.g., within 10%) throughout the cross-section of the backing material.

In one embodiment, the sorbent material is present in no more than 50%, 40%, 30%, or even 20% or less by weight per weight of the backing; and at least 5% or even 10% by weight per weight of the backing.

In one embodiment, the thickness of the backing layer is at least 50, 75, 100, 125, or even 150 microns. In one embodiment, the thickness of the backing layer is no more than 1 mm, 800 microns, 500 microns, or even 300 microns.

In one embodiment, a porous fiber matrix is used to entrap the sorbent material. For example, the fibers are mixed to form a pulp and the sorbent material is added. Then a polymeric binder is added to bind the fibrous pulp together and the liquid is removed to form the backing.

Useful binders are those materials that are stable and that exhibit little or no interaction (i.e., chemical reaction) with either the fibers of the pulp or the sorbent material entrapped therein. Natural and synthetic polymeric materials, originally in the form of latexes, may be used. Common examples of useful binders include, but are not limited to, natural rubbers, neoprene, styrene-butadiene copolymer, acrylate resins, polyvinyl chloride, and polyvinyl acetate. In one embodiment, the backing layer comprises less than 25%, 20%, 15%, 10%, 5%, 3%, or even less than 1% based on weight of the binder versus total weight of the backing layer.

In one embodiment, the backing further comprises colorants (such as titanium dioxide), antioxidants, and other additives known in the art.

The basis weight of the backing will vary widely depending upon the particular application, but normally will be in the range from about 20 grams per square meter to 75 grams per square meter or even in the range from about 20 grams per square meter to 60 grams per square meter, although heavier or lighter backing can be use if desired.

In one embodiment, the backing of the present disclosure has a surface area of at least 10, 50, 100, 150, or even 200 $m^2/g$ based on MBET (modified Brunauer Emmet Teller method) nitrogen adsorption).

In one embodiment, the backing of the present disclosure has a calculated average pore diameter per ISO 15901-3: 2007 of more than 1.0 nm and no more than 10, 5 or even 3.0 nm.

Adhesive Layer

An adhesive layer substantially coats the outer surface of at least one major surface of the backing. In the present disclosure, the adhesive layer is a pressure-sensitive adhesive (PSA) PSAs are adhesives whose set film in the dry state at room temperature remains permanently tacky and adhesive. Even with relatively weak applied pressure, PSAs permit a durable bond to be made to the substrate, and after use can be detached from the substrate again with substantially no residue. The bondability of the adhesives is based on their adhesive properties and their redetachability on their cohesive properties.

The PSAs used in the present disclosure include those known in the art. The pressure-sensitive adhesive can include a solvent-based pressure-sensitive adhesive and/or a water-based pressure-sensitive adhesive, a hot melt coated pressure sensitive adhesive or an adhesive formed by polymerization on a substrate. The pressure-sensitive adhesive can include at least one of an acrylic, a tackified acrylic, a vinyl ether, a tackified rubber-based adhesive (wherein the rubber is for example: natural rubber, styrene-isoprene copolymers, an acrylonitrile-butadiene copolymer, styrene-butadiene copolymer, acrylic polymer), silicone, polyurethanes, polyesters, and vinyl ethers.

In some embodiments tackifiers and plasticizers may also be added to the adhesive composition that makes up the adhesive layer. Tackifiers, include for example, rosin, rosin derivatives, hydrogenated rosin derivatives, polyterpene resins, phenolic resins, coumarone-indene resins, poly-t-butyl styrene and combinations thereof. Plasticizers include for example, hydrocarbon oils, hydrocarbon resins, polyterpenes, rosin esters, phthalates, phosphate esters, dibasic acid esters, fatty acid esters, polyethers, and combinations thereof.

In one embodiment, the adhesive compositions may be coated onto the backing by any of a variety of conventional coating techniques known in the art, such as roll coating, spray coating, knife coating, extrusion, die-coating, and the like.

In one embodiment, the adhesive layer thickness typically may be in the range of about 0.0025 mm to 0.13 mm (0.1 mil to 5.0 mil), and more typically in the range of about 0.0013 mm to 0.076 mm (0.5 mil to 3.0 mil).

Liner

As used herein, a backing is a permanent support intended for final use of the adhesive article. A liner, on the other hand, is a temporary support that is not intended for final use of the adhesive article and is used during the manufacture or storage to support and/or protect the adhesive article. A liner is removed from the adhesive article prior to use.

In the present disclosure, a liner may optionally be used opposite the backing, with the PSA sandwiched therebetween. Alternatively, the backing may be coated with a release coating on its second major surface side opposite the PSA.

To facilitate easy removal from the adhesive layer, the liner and release coating comprise a release agent. Such release agents are known in the art and are described, for example in "Handbook of Pressure Sensitive Adhesive Technology," D. Satas, editor. Van Nostrand Reinhold, New York, N.Y., 1989, pp. 585-600. In one embodiment, the release agent migrate to the surface (on the liner or release coating) to provide the appropriate release properties.

Examples of release agents include carbamates, silicones and fluorocarbons. Preferred release agents are carbamates having relatively high softening points. Carbamates having long side chains have relatively high softening points and thus are particularly suitable in the present disclosure. A particularly preferred release agent for use in the present disclosure is polyvinyl octadecyl carbamate, available from Anderson Development Co, of Adrian, Mich., marketed as ESCOAT P20, and from Mayzo Inc. of Norcross, Ga., marketed in various grades as RA-95H, RA-95HS, RA-155 and RA-585S.

Illustrative examples of surface applied (i.e., topical) release agents include polyvinyl carbamates such as disclosed in U.S. Pat. No. 2,532,011 (Dahlquist et al.), reactive silicones, fluorochemical polymers, epoxysilicones such as are disclosed in U.S. Pat. No. 4,313,988 (Bang et al.) and U.S. Pat. No. 4,482,687 (Kessel et al.), polyorganosiloxane-polyurea block copolymers such as are disclosed in European Appln. No. 250,248 (Leir et al.), etc.

Construction

FIG. 1 depicts one exemplary embodiment of an adhesive article according to the present disclosure. Adhesive article 10 comprises backing 12 and adhesive layer 14, which is fixedly attached to backing 12. The adhesive article may optionally comprise liner 16 in contact with adhesive layer 14, opposite backing 12. Optional layer 18 can be a release coating applied onto the backside of the backing, opposite the adhesive layer. Optional layer 18 could also be an adhesive or a printed image.

In one embodiment, the adhesive article of the present disclosure does not include a gas impermeable plastic film over the backing layer, wherein the backing layer is disposed between the pressure sensitive adhesive layer and the plastic film.

The backing comprises a first and second major surface, wherein the first major surface contacts a first adhesive layer. The adhesive layer can be laminated or bonded to the backing. In some embodiments, a primer, as is known in the art, is used between the backing and the adhesive layer to improve adhesion between the backing and the adhesive layer. In one embodiment, a primer may not be needed between the backing and the adhesive for example, when the (meth)acrylate polymer of the saturant and the crosslinkable (meth) acrylate polymer of the adhesive are the same (e.g., both butylacrylate).

In the present disclosure, the first major surface of the backing is substantially free of a release material or release coating.

In one embodiment, the adhesive article comprises a second adhesive on the second major surface of the backing. The second adhesive may be the same or different from the adhesive on the first major surface of the backing.

The adhesive articles of the present disclosure may include a tape and/or a label.

It has been discovered that a backing comprising a sorbent material can be used to effectively sorb VOC. For example, in one embodiment, the adhesive article of the present disclosure has a VOC of less than 1000, 500, or even 100 as measured by the German Automotive Industry Association (Verband der Automobilindustrie (VDA)) test method VDA 278 (2011): "Thermal Desorption Analysis of Organic Emissions for the Characterization of Non-Metallic Materials for Automobiles" or the VOC Test Method disclosed herein. In one embodiment, the adhesive article of the present disclosure has an adhesive article has a FOG of less than 100, 50, 10, or even 5 µg/g as measured by the VOC Test Method disclosed herein.

It has been discovered that the presence of the sorbent material in the backing of the adhesive article provides a more effective removal of the VOCs as compared to its use in a liner.

Exemplary embodiments of the present disclosure, include, but are not limited to:

Embodiment 1

An adhesive article comprising:
a backing comprising a sorbent material entrapped in a non-woven fiber matrix, wherein the backing comprises a first and a second major surface; and
a first adhesive layer contacting the first major surface of the backing, wherein the first adhesive layer comprises a pressure sensitive adhesive.

Embodiment 2

The adhesive article of embodiment 1, wherein the first major surface is substantially free of a release material.

Embodiment 3

The adhesive article of anyone of the previous embodiments, wherein the non-woven fiber matrix comprises fibers of at least one of a natural fiber and a synthetic polymer fiber.

Embodiment 4

The adhesive article of embodiment 3, wherein the synthetic polymer fiber comprises at least one of polyethylene, polypropylene, polyester, nylon, and polylactic acid.

Embodiment 5

The adhesive article of embodiment 3, wherein the natural fiber comprises at least one of cellulose, hemp, bamboo, and cotton.

Embodiment 6

The adhesive article of any one of the previous embodiments, wherein the sorbent material is present in 50% or less by weight of the backing.

Embodiment 7

The adhesive article of any one of the previous embodiments, wherein the sorbent material is a porous material.

Embodiment 8

The adhesive article of any one of the previous embodiments, wherein the sorbent material comprises at least one of an activated carbon, silica gel, and a zeolite.

Embodiment 9

The adhesive article of any one of the previous embodiments, wherein the pressure sensitive adhesive comprises at least one an acrylic, a tackified acrylic, a tackified rubber-based adhesive, silicone, and polyurethanes.

Embodiment 10

The adhesive article of any one of the previous embodiments, further comprising a second adhesive on the second major surface of the backing.

Embodiment 11

The adhesive article of embodiment 10, wherein the second adhesive is different from the first adhesive.

Embodiment 12

The adhesive article of embodiment 10, wherein the second adhesive is the same as the first adhesive.

Embodiment 13

The adhesive article of any one of the previous embodiments, further comprising a liner, where the first adhesive layer is disposed between the liner and the backing.

Embodiment 14

The adhesive article of any one of embodiments 1-9, further comprising a release coating layer disposed on the second major surface of the backing.

Embodiment 15

The adhesive article of any one of the previous embodiments, wherein the adhesive article is a tape, or a label.

Embodiment 16

The adhesive article according to any one of the previous embodiments, wherein the adhesive article has a VOC of less than 1000 µg/g as measured by VOC Test Method.

Embodiment 17

The adhesive article according to any one of the previous embodiments, wherein the adhesive article has a VOC of less than 500 µg/g as measured by VOC Test Method.

Embodiment 18

The adhesive article according to any one of the previous embodiments, wherein the adhesive article has a FOG of less than 100 µg/g as measured by VOC Test Method.

Embodiment 19

The adhesive article according to any one of the previous embodiments, wherein the adhesive article has a FOG of less than 50 µg/g as measured by VOC Test Method.

Embodiment 20

The adhesive article according to any one of the previous embodiments, wherein the adhesive article has a FOG of less than 10 µg/g as measured by VOC Test Method.

Embodiment 21

A method of making an adhesive article comprising:
(a) providing a backing comprising a sorbent material entrapped in a non-woven fiber matrix; and
(b) disposing a first adhesive layer onto a first major surface of the backing, wherein the first adhesive layer comprises a pressure sensitive adhesive.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: g=grams, kg=kilograms, min=minutes, and hr=hour.

Materials

| Name | Description |
|---|---|
| Backing No. 1 | Engineered carbon sheet available from MeadWestVaco, Covington, VA. The sample comprises 5-95% cellulose fiber and <5% polyester solid with a 5-75% by wt loading of activated carbon, 25-95% by wt of fiber. Measured basis weight is 61.2 g/m$^2$ with a thickness of 0.743 mm. |
| Backing No. 2 | Engineered carbon sheet available from MeadWestVaco. The sample comprises polypropylene fiber with a 40-48% by wt loading of activated carbon, 32-37% by wt of fiber and 8-12% by wt of binder. Measured basis weight is 128.0 g/m$^2$ with a thickness of 0.874 mm. |
| Fiber 1 | Cellulose pulp, 125 freeness, 2.09% solids, prepared as below |
| Fiber 2 | Acrylonitrile fibers 4.5-7.5 mm, product # CFF-114-3, Sterling Fibers, Pace, FL |
| Fiber 3 | 2 denier, 5 mm copolyethylene terephthalate (PET)/PET bicomponent fibers, obtained from Minifibers, Inc, Johnson City, TN. |
| Additive | Activated Carbon, PGW-20MP from Kuraray Co, Japan |

Preparation of Fiber 1

Sheets of cellulose pulp (Chinook Kraft pulp) was obtained from Domtar Paper Company, Kamloops, BC, Canada. 45.36 kg of this cellulose pulp was weighed and added into a scrap pulper (Black Clawson Co., Middletown, Ohio) containing 2172.8 liters of river water to achieve a 2.09% solids consistency. The sheets of pulp were refined for 10 minutes in the scrap pulper then transferred to a refiner (Double-Disc DD 4400 refiner available from Beloit Corp., Dalton, Mass.), and processed for 40 minutes, at 120 amps.

Preparation of Backing No. 3

Fiber 2 was added to 3 liters of cold deionized water in a 4 L blender (available from VWR, Radnor, Pa., under the trade designation "WARING COMMERCIAL HEAVY DUTY BLENDER, MODEL 37BL84") and was blended for 60 seconds at medium speed. Fiber 1 and 3 were added to the blender and blended for 60 seconds on low speed. The mixture was examined for uniform dispersion of the fibers. The Additive, was added with an additional liter of deionized water and mixed at low speed for 30 seconds. The formulation and basis weight for Backing No. 3 is shown in Table 1.

TABLE 1

| | Material Dry Weight (grams) |
|---|---|
| Fiber 1 | 2 |
| Fiber 2 | 2 |
| Fiber 3 | 1.37 |
| Additive | 2 |
| Basis Weight (in gsm) | 48 |

A felt was prepared using a pad maker apparatus (obtained from Williams Apparatus, Watertown, N.Y., under the trade designation "TAPPI") that had a box measuring about 30 centimeters (12 inches) square and 30 centimeters (12 inches) high with a fine mesh screen at the bottom and a drain valve. On the screen ~a 14 inch×12 inch piece of a polyethylene spunbond (PET Lutradur 7240 obtained from Fiberweb, Cincinnati, Ohio) was laid as scrim on the screen. The box was filled with tap water up to about 2 inches from the top of the box. The fiber and additive mixture was poured into the box and the valve was opened immediately which created a vacuum that pulled the water out of the box. The resulting wet-laid felt was approximately 350 micrometer thick.

The wet-laid felt was transferred from the apparatus onto a 20 centimeter square sheet of blotter paper (96-pound white paper, obtained from Anchor Paper, St. Paul, Minn.). The felt was placed on 2 layers of blotter paper to blot excess water. The felt was then transferred onto an aluminum tray and placed in an oven (from Despatch Industries, MN, US, model LFD1-42-3) set at 65° C. for about 4 hrs to remove residual solvent and to form a porous wet-laid matrix.

Volatile Organic Compound Emissions and FOG Testing (VOC Test Method)

Analysis of volatile organic emissions and FOG properties was done generally according to the German Automotive Industry Association (Verband der Automobilindustrie (VDA)) test method VDA 278 (2011): "Thermal Desorption Analysis of Organic Emissions for the Characterization of Non-Metallic Materials for Automobiles" using Markes Unity Thermal Desorption/Agilent 6890/5975 GC/MS instrumentation. Toluene and hexadecane are used as surrogate standards for VOC and FOG measurements respectively. The samples were not evaluated seven days after the initial test. The samples mass was calculated as per mass of adhesive layer without the mass of the Backing.

Laminate articles were prepared by applying the designated Backing No. to the exposed adhesive of an adhesive transfer tape as described in the Examples below. These laminate articles were wrapped in aluminum foil and stored at room temperature until use.

For Examples 1-2, the laminate articles were all prepared on the same day and stored 18 days before testing.

A laminate article measuring 2 millimeters wide and having a length of between 2 and 3 centimeters was cut to fit inside the mid-section of the 0.25 inch diameter glass tubes used in the thermal desorption system. Then the Kraft paper liner was removed from the laminate article and the laminate was inserted into the blank glass tube for testing. The result obtained was for the raw sample. The blank glass tube was run under the same conditions and the results were subtracted from the raw sample peak area before the calculations were completed. The resulting samples pieces were then evaluated as described in VDA 278 to measure volatile organic compound (VOC) emissions and FOG properties. Two samples were run for each laminate article and the higher value was reported.

Gas Sorption Test for Surface Area and Pore Size

The test was conducted on Autosorb IQ gas sorption analyzer from Quantachrome Instruments, FL, US. $N_2$ was used as the adsorbate to obtain isotherm (sorbed gas volume vs. partial pressure $P/P_0$ in the range of 10^-5~0.995) at 77K. Surface area was calculated with multiple points in the selected partial pressure range based on Brunauer-Emmett-Teller (BET) theory, and average pore size was calculated based on the information of surface area and the last point in the adsorption range ($P/P_0$~0.995) for micropore and mesopore size range (diameter up to ~50 nm). The results are reported in Table 2 below.

TABLE 2

| Backing No. | Surface area MBET/($m^2$/g) | Average Pore diameter/(nm) |
|---|---|---|
| 1 | 630.8 | 3.1 |
| 2 | 466.7 | 3.6 |
| 3 | 253.7 | 3.0 |

Adhesive Transfer Tape 1

Adhesive Transfer Tape 1 is a 0.004 inch (0.10 mm) thick acrylic adhesive tape on a 0.004 inch (0.10 mm) thick, densified kraft paper liner. The adhesive transfer tape has the following construction: adhesive/kraft paper liner.

Adhesive Transfer Tape/Sorbent Backing Laminate

The designated Backing No. was laminated to the exposed adhesive surface of Adhesive Transfer Tape 1. The laminate construction was pressed together using a rubber roller and hand pressure creating the following construction: Backing No./adhesive/kraft paper liner.

Examples 1-2

Various Adhesive Transfer Tape/Sorbent Backing Laminate were prepared and evaluated for VOC and FOG as described in the test methods above. The Backing No. used and the test results are shown in Table 2 below.

Comparative Example 1 (CE 1)

A 0.002 inch (50 micrometer) thick, untreated polyethylene terephthalate (PET) film was laminated as described in Adhesive Transfer Tape/Sorbent Backing Laminate creating the following construction: PET/adhesive/kraft paper liner. The kraft paper liner was removed and the sample was tested per the Volatile Organic Compound Emissions and FOG Testing except that instead of a blank glass tube used as the blank, the PET film without the adhesive was run under the same conditions and this result was subtracted from the raw sample peak area of the PET/adhesive sample before the calculations were completed to determine the VOC and FOG levels of the adhesive itself. The result is reported in Table 3.

TABLE 3

| Example | Backing No. | VOC µg/g | FOG µg/g |
|---|---|---|---|
| 1 | 1 | 67 | <3 |
| 2 | 2 | 149 | <2 |
| 3 | 3 | 40 | ≤1 |
| CE1 | none | 3952 | 244 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An adhesive article comprising:
    a backing comprising a sorbent material entrapped in a non-woven fiber matrix, wherein the sorbent material is distributed throughout the backing and wherein the backing comprises a first and a second major surface;
    a release coating layer disposed on the second major surface of the backing; and
    a first adhesive layer contacting the first major surface of the backing, wherein the first adhesive layer comprises a pressure sensitive adhesive.

2. The adhesive article of claim 1, wherein the first major surface is substantially free of a release material.

3. The adhesive article of claim 1, wherein the non-woven fiber matrix comprises fibers of at least one of polyethylene, polypropylene, polyester, nylon, and polylactic acid.

4. The adhesive article of claim 1, wherein the non-woven fiber matrix comprises fibers of at least one of cellulose, hemp, bamboo, and cotton.

5. The adhesive article of claim 1, wherein the sorbent material is present in 50% or less by weight of the backing.

6. The adhesive article of claim 1, wherein the sorbent material comprises at least one of an activated carbon, silica gel, and a zeolite.

7. The adhesive article of claim 1, wherein the pressure sensitive adhesive comprises at least one an acrylic, a tackified acrylic, a tackified rubber-based adhesive, silicone, and polyurethanes.

8. The adhesive article of claim 1, further comprising a liner, where the first adhesive layer is disposed between the liner and the backing.

9. The adhesive article of claim 1, wherein the adhesive article is a tape, or a label.

10. The adhesive article of claim 1, wherein the adhesive article has a VOC of less than 1000 µg/g as measured by VOC Test Method.

11. The adhesive article of claim 1, wherein the adhesive article has a FOG of less than 100 µg/g as measured by VOC Test Method.

12. The adhesive article of claim 1, wherein the sorbent material is a porous material.

13. A method of making an adhesive article comprising:
    (a) providing a backing having a first major surface and an opposing second major surface, the backing comprising a sorbent material entrapped in a non-woven fiber matrix, wherein the sorbent material is distributed throughout the backing; and
    (b) providing a release coating layer disposed on the second major surface of the backing; and
    (c) disposing a first adhesive layer onto the first major surface of the backing, wherein the first adhesive layer comprises a pressure sensitive adhesive.

* * * * *